(12) United States Patent
Tseng et al.

(10) Patent No.: US 12,377,686 B2
(45) Date of Patent: Aug. 5, 2025

(54) PNEUMATIC TIRE CAPABLE OF MAINTAINING STEERING ABILITY AND IMPROVING DRAINAGE

(71) Applicant: CHENG SHIN RUBBER IND. CO., LTD., Changhua County (TW)

(72) Inventors: Jen-Hsuan Tseng, Changhua County (TW); Liang-Kuei Wang, Changhua County (TW)

(73) Assignee: Cheng Shin Rubber Ind. Co., Ltd., Changhua County (TW)

( * ) Notice: Subject to any disclaimer, the term of this patent is extended or adjusted under 35 U.S.C. 154(b) by 11 days.

(21) Appl. No.: 18/413,294

(22) Filed: Jan. 16, 2024

(65) Prior Publication Data

US 2024/0316990 A1    Sep. 26, 2024

(30) Foreign Application Priority Data

Mar. 22, 2023 (TW) ................................ 112110712

(51) Int. Cl.
*B60C 11/03* (2006.01)
*B60C 11/13* (2006.01)

(52) U.S. Cl.
CPC ...... *B60C 11/0302* (2013.01); *B60C 11/0304* (2013.01); *B60C 11/1323* (2013.01); *B60C 2011/0353* (2013.01); *B60C 2011/0365* (2013.01); *B60C 2011/0381* (2013.01); *B60C 2200/04* (2013.01)

(58) Field of Classification Search
CPC ......... B60C 11/0304; B60C 2011/0365; B60C 2011/0381
See application file for complete search history.

(56) References Cited

U.S. PATENT DOCUMENTS

| D399,461 | S | * | 10/1998 | Lurois | D12/900 |
| D829,638 | S | * | 10/2018 | Trigueros | D12/517 |
| 2011/0088821 | A1 | * | 4/2011 | Imakita | B60C 11/0302 |
| | | | | | 152/209.15 |
| 2018/0134087 | A1 | * | 5/2018 | Okada | B60C 11/0302 |
| 2020/0189322 | A1 | * | 6/2020 | Sangalli | B60C 11/0304 |

FOREIGN PATENT DOCUMENTS

| CN | 103287218 B | 8/2016 |
| CN | 108068556 B | 5/2021 |
| WO | WO-2018/162822 A1 * | 9/2018 |

OTHER PUBLICATIONS

Machine translation for WO 2018/162822 (Year: 2025).*

* cited by examiner

*Primary Examiner* — Steven D Maki
(74) *Attorney, Agent, or Firm* — Rosenberg, Klein & Lee

(57) ABSTRACT

A pneumatic tire capable of maintaining steering ability and improving drainage includes a tire body, a plurality of first auxiliary grooves, a plurality of second auxiliary grooves, and a plurality of third auxiliary grooves. Each first auxiliary groove is gradually tapered from a first outer end toward an outer side. Each second auxiliary groove is gradually tapered from a second outer end toward an inner side. Each third auxiliary groove is gradually tapered from a third inner end toward the outer side. Each groove is in the form of a tapered, jagged groove to improve drainage efficiency and increase the rigidity of two shoulder portions of the tire body.

9 Claims, 5 Drawing Sheets

PNEUMATIC TIRE CAPABLE OF MAINTAINING STEERING ABILITY AND IMPROVING DRAINAGE

FIELD OF THE INVENTION

The present invention relates to a pneumatic tire, and more particularly, to a pneumatic tire capable of maintaining steering ability and improving drainage.

BACKGROUND OF THE INVENTION

High-performance car tires are mainly used for high-performance vehicles that run on paved roads. These tires generally have higher drive speeds and lower flat ratios. Therefore, these tires require stable steering ability on dry roads and better drainage on wet roads.

Chinese Patent Publication No. CN 103287218 B discloses a pneumatic tire, which has a steeper slope of the steeply inclined portion on the inner side of the first transverse groove and a slower slope of the slowly inclined portion on the outer side of the first transverse groove, such that the drainage performance of the tire is improved, and water in the first transverse groove is discharged efficiently toward the outer side of the ground contact end of the tread.

Chinese Patent Publication No. CN 108068556 B discloses a tire, which has a first transverse groove extending to the outer side of the ground contact end of the tread to improve drainage performance. The tire further has a second transverse groove. The inner side of the second transverse groove does not communicate with the main groove. The outer side of the second transverse groove does not intersect with the ground contact end. This maintains the rigidity of the ground contact portion of the tire, so the grip performance of the tire won't be affected.

However, in the aforementioned CN 103287218 B patent, the steeply inclined portion on the inner side of the first transverse groove forms an angle with the outer side of the inclined groove, making it difficult to maintain the rigidity of the tread block and resulting in insufficient dry grip.

In the aforementioned CN 108068556 B patent, because the inclination angle of the second transverse groove is too large, it is easy to cause the rigidity of the circumferential tread block of the tire to become uneven, resulting in uneven wear.

SUMMARY OF THE INVENTION

The primary object of the present invention is to provide a pneumatic tire capable of maintaining steering ability and improving drainage. The pneumatic tire comprises a tire body, a plurality of first auxiliary grooves, a plurality of second auxiliary grooves, and a plurality of third auxiliary grooves. The tire body defines an outer side and an inner side opposite to the outer side. The tire body has an outer shoulder portion located on the outer side and an inner shoulder portion located on the inner side. The tire body has a circumferential direction and an axial direction perpendicular to the circumferential direction. The plurality of first auxiliary grooves are disposed on the outer shoulder portion. The plurality of second auxiliary grooves are adjacent to the first auxiliary grooves and disposed on the outer shoulder portion. The plurality of third auxiliary grooves are disposed on the inner shoulder portion. The first auxiliary grooves each include a first inner end close to the inner side, a first notch close to the inner side and extending toward an inside of the corresponding first auxiliary groove, a first outer end on an edge of the first notch close to the outer side and away from the inside of the corresponding first auxiliary groove, and a first tip on the edge of the first notch close to the outer side and close to the inside of the corresponding first auxiliary groove. Each first auxiliary groove is gradually tapered from the first outer end toward the outer side. The second auxiliary grooves each includes a second inner end close to the inner side, a second notch close to the outer side and extending toward an inside of the corresponding second auxiliary groove, a second outer end on an edge of the second notch close to the inner side and away from the inside of the corresponding second auxiliary groove, and a second tip on the edge of the second notch close to the inner side and close to the inside of the corresponding second auxiliary groove. Each second auxiliary groove is gradually tapered from the second outer end toward the inner side. The third auxiliary grooves each includes an outer inner end close to the outer side, a third notch close to the inner side and extending toward an inside of the corresponding third auxiliary groove, a third inner end on an edge of the third notch close to the outer side and away from the inside of the corresponding third auxiliary groove, and a third tip on the edge of the third notch close to the outer side and close to the inside of the corresponding third auxiliary groove. Each third auxiliary groove is gradually tapered from the third inner end toward the outer side. In the axial direction, the first tip is located on the outer side of the first outer end, the second tip is located on the inner side of the second outer end, and the third tip is located on the outer side of the third inner end.

Preferably, a ground contact end line is defined on each of the outer shoulder portion and the inner shoulder portion along the circumferential direction. The ground contact end line on the outer shoulder portion passes through the first auxiliary grooves and the second auxiliary grooves. A first ground contact end groove width is defined along the ground contact end line on each first auxiliary groove. A second ground contact end groove width is defined along the ground contact end line on each second auxiliary groove. The ground contact end line on the inner shoulder portion passes through the third auxiliary grooves. A third ground contact end groove width is defined along the ground contact end line on each third auxiliary groove. The first ground contact end groove width is between 3 and 4.5 mm. The second ground contact end groove width is between 3.7 and 5 mm. The third ground contact end groove width is between 6.4 and 10.2 mm.

Preferably, a ground contact pressure line is defined on each of the outer shoulder portion and the inner shoulder portion along the circumferential direction. The ground contact pressure line on the outer shoulder portion passes through the first auxiliary grooves and the second auxiliary grooves. A first ground contact pressure groove width is defined along the ground contact pressure line on each first auxiliary groove. A second ground contact pressure groove width is defined along the ground contact pressure line on each second auxiliary groove. The ground contact pressure line on the inner shoulder portion passes through the third auxiliary grooves. A third ground contact pressure groove width is defined along the ground contact pressure line on each third auxiliary groove. The first ground contact pressure groove width is between 7.5 and 11.3 mm. The second ground contact pressure groove width is between 9.3 and 12.5 mm. The third ground contact pressure groove width is between 9.8 and 17.2 mm.

Preferably, the first ground contact end width is between 30% and 40% of the first ground contact pressure groove width, the second ground contact end width is between 30% and 40% of the second ground contact pressure groove width, and the third ground contact end width is between 58% and 68% of the third ground contact pressure groove width.

Preferably, a ground contact width is defined along the axial direction between the two ground contact end lines on the outer shoulder portion and the inner shoulder portion. The ground contact width is between 185 and 245 mm. The first ground contract pressure groove width is between 2% and 7% of the ground contact width. The second ground contract pressure groove width is between 2% and 7% of the ground contact width. The third ground contract pressure groove width is between 2% and 7% of the ground contact width.

Preferably, the first ground contact pressure groove width is less than the second ground contact pressure groove width, and the second ground contact pressure groove width is less than the third ground contact pressure groove width.

Preferably, a ground contact end line is defined on each of the outer shoulder portion and the inner shoulder portion along the circumferential direction. A ground contact width is defined along the axial direction between the two ground contact end lines on the outer shoulder portion and the inner shoulder portion. The tire body further has an outer main groove adjacent to the outer shoulder portion and an inner main groove adjacent to the outer main groove and the inner shoulder portion. A first distance is defined between the first auxiliary groove and the outer main groove. The first distance is between 2% and 6% of the ground contact width. A second distance is defined between the second auxiliary groove and the outer main groove. The second distance is between 11% and 15% of the ground contact width. A third distance is defined between the third auxiliary groove and the inner main groove. The third distance is between 4% and 8% of the ground contact width.

Preferably, a ground contact end line is defined on each of the outer shoulder portion and the inner shoulder portion along the circumferential direction. A ground contact width is defined along the axial direction between the two ground contact end lines on the outer shoulder portion and the inner shoulder portion. A second groove length is defined along the axial direction from the second inner end to the second outer end. The second groove length is between 14% and 18% of the ground contact width. A third groove length is defined along the axial direction from the third inner end to the third outer end. The third groove length is between 14% and 18% of the ground contact width.

Preferably, the first auxiliary grooves and the second auxiliary grooves are alternately arranged on the outer shoulder portion along the circumferential direction.

The above technical features have the following advantages:

1. Each of the first auxiliary grooves, the second auxiliary groove and the third auxiliary grooves is the form of a tapered, jagged groove. The wider sides of the grooves increase the groove capacity to enhance the drainage efficiency, so that the vehicle can retain excellent grip even on slippery roads. The narrower sides of the grooves improve the rigidity of the two shoulder portions.

2. Through the selection of each groove width on the ground contact pressure line, the pneumatic tire can maintain steering ability and improve drainage performance.

3. Different ratios enable the two shoulder portions of the tire to obtain different rigidities, providing excellent steering ability.

4. The sharp edges of each inner end, each outer end and each tip are beneficial to wet grip performance.

DETAILED DESCRIPTION OF THE PREFERRED EMBODIMENTS

Embodiments of the present invention will now be described, by way of example only, with reference to the accompanying drawings.

Figure 1:
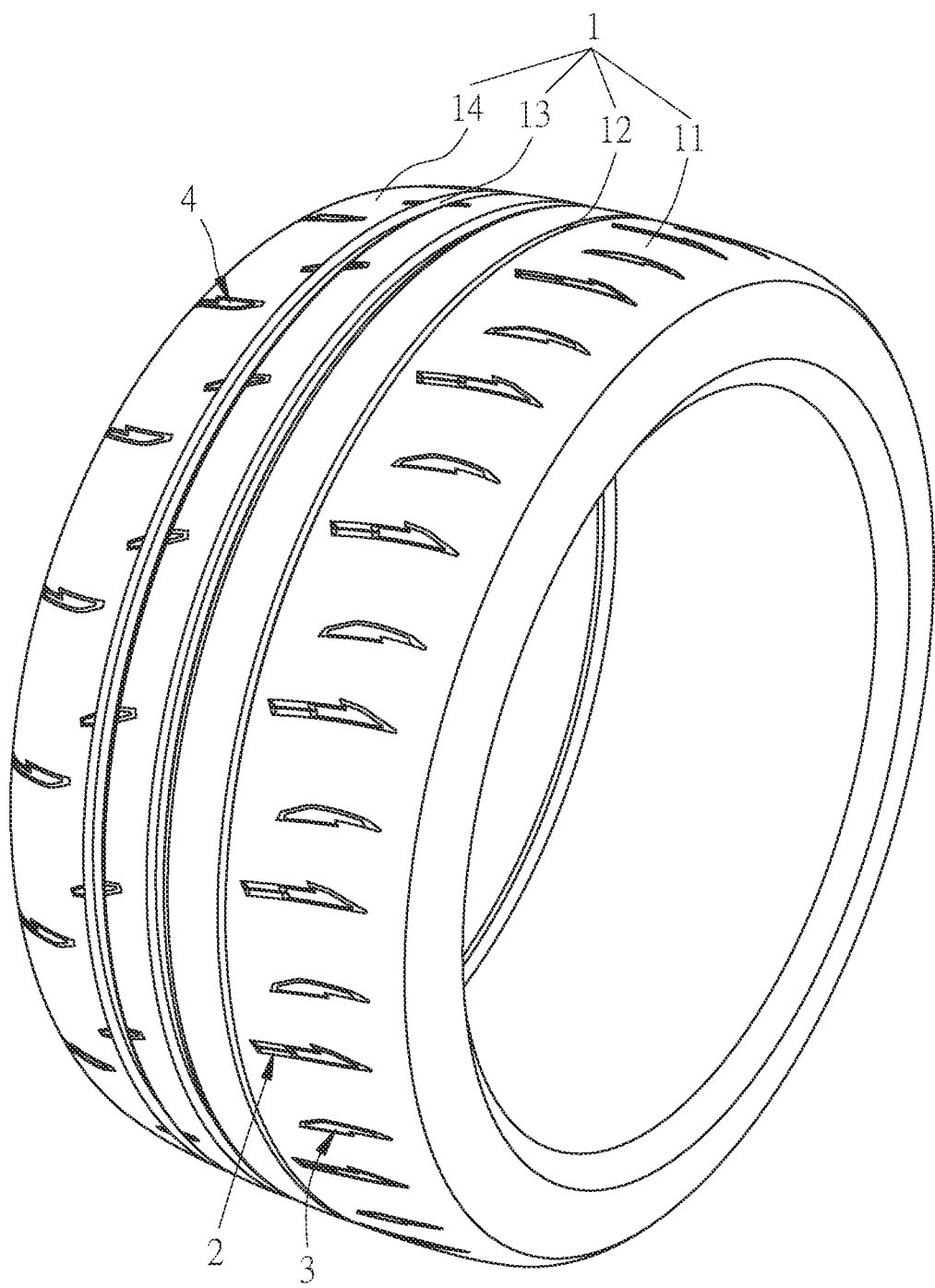
FIG. 1 is a perspective view of an embodiment of the present invention.
Figure 2:
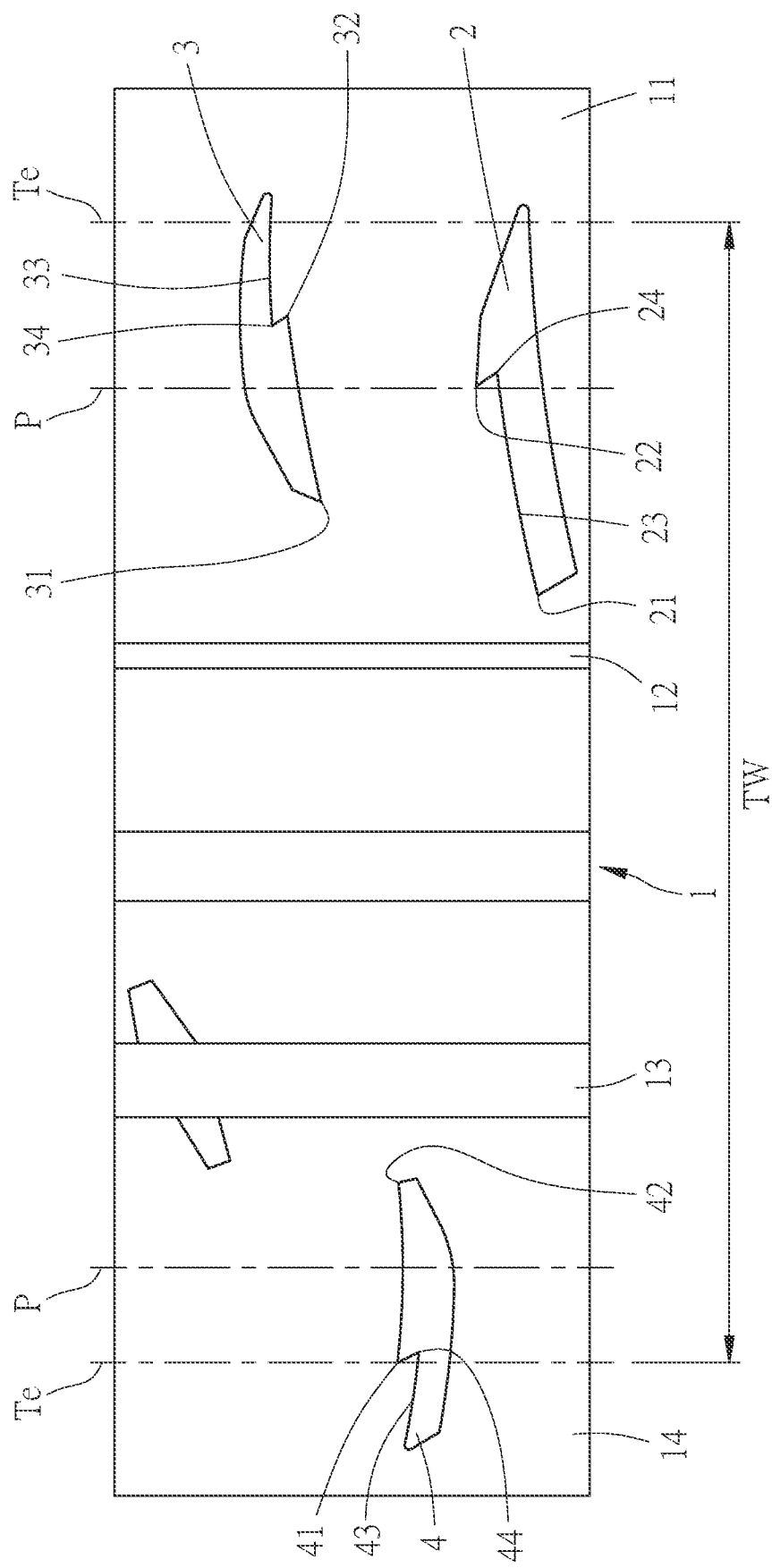
FIG. 2 is a first partial, expanded planar view of the embodiment of the present invention.

As shown in FIG. 1 and FIG. 2, the present invention discloses a pneumatic tire capable of maintaining steering ability and improving drainage, comprising a tire body 1, a plurality of first auxiliary grooves 2, a plurality of second auxiliary grooves 3, and a plurality of third auxiliary grooves 4.

The tire body 1 defines an outer side and an inner side opposite to the outer side, that is, when the tire is installed to a vehicle, the side far away from the vehicle is defined as the outer side, and the side close to the vehicle is defined as the inner side. The tire body 1 has an outer shoulder portion 11, an outer main groove 12, an inner main groove 13, and an inner shoulder portion 14. The outer shoulder portion 11 is located on the outer side. The inner shoulder portion 14 is located on the inner side. Between the outer shoulder portion 11 and the inner shoulder portion 14, the outer main groove 12 is adjacent to the outer shoulder portion 11, and the inner main groove 13 is adjacent to the outer main groove 12 and the inner shoulder portion 14.

The tire body 1 has a circumferential direction and an axial direction perpendicular to the circumferential direction. A ground contact pressure line P and a ground contact end line Te adjacent to the ground contact pressure line P are defined on each of the outer shoulder portion 11 and the inner shoulder portion 14 along the circumferential direction. The ground contact pressure line P refers to the pressure generated when the tire body 1 is in contact with the ground, which is distributed on the outer shoulder portion 11 where the pressure is higher. A ground contact width TW is defined along the axial direction between the two ground contact end lines Te. The ground contact width TW is between 185 and 245 mm.

The plurality of first auxiliary grooves 2 are disposed on the outer shoulder portion 11. The first auxiliary grooves 2 each include a first inner end 21, a first outer end 22, a first notch 23, and a first tip 24. The first inner end 21 is close to the inner side. The first notch 23 is close to the inner side and extends toward the inside of the corresponding first auxiliary groove 2. The first outer end 22 is on the edge of the first notch 23 close to the outer side and away from the inside of the corresponding first auxiliary groove 2. The first tip 24 is on the edge of the first notch 23 close to the outer side and close to the inside of the corresponding first auxiliary groove 2. In the axial direction, the first tip 24 is located on the outer side of the first outer end 22.

The plurality of second auxiliary grooves 3 are adjacent to the first auxiliary grooves 2 and are disposed on the outer shoulder portion 11. Preferably, the first auxiliary grooves 2 and the second auxiliary grooves 3 are alternately arranged on the outer shoulder portion 11 along the circumferential direction. The second auxiliary grooves 3 each include a second inner end 31, a second outer end 32, a second notch 33, and a second tip 34. The second inner end 31 is close to the inner side. The second notch 33 is close to the outer side and extends toward the inside of the corresponding second auxiliary groove 3. The second outer end 32 is on the edge of the second notch 33 close to the inner side and away from the inside of the corresponding second auxiliary groove 3. The second tip 34 is on the edge of the second notch 33 close to the inner side and close to the inside of the corresponding second auxiliary groove 3. In the axial direction, the second tip 34 is located on the inner side of the second outer end 32.

The plurality of third auxiliary grooves 4 are disposed on the inner shoulder portion 14. The third auxiliary grooves 4 each include a third inner end 41, a third outer end 42, a third notch 43, and a third tip 44. The third outer end 42 is close to the outer side. The third notch 43 is close to the inner side and extends toward the inside of the corresponding third auxiliary groove 4. The third inner end 41 is on the edge of the third notch 43 close to the outer side and away from the inside of the corresponding third auxiliary groove 4. The third tip 44 is on the edge of the third notch 43 close to the outer side and close to the inside of the corresponding third auxiliary groove 4. In the axial direction, the third tip 44 is located on the outer side of the third inner end 41.

Each first auxiliary groove 2 is gradually tapered from the first outer end 22 toward the outer side. Each second auxiliary groove 3 is gradually tapered from the second outer end 32 toward the inner side. Each third auxiliary groove 4 is gradually tapered from the third inner end 41 toward the outer side. Each groove is in the form of a tapered, jagged groove.

The sharp edges of the first inner end 21, the first outer end 22, the first tip 24, the second inner end 31, the second outer end 32, the second tip 34, the third inner end 41, the third outer end 42 and the third tip 44 are beneficial to wet grip performance.

Figure 3:
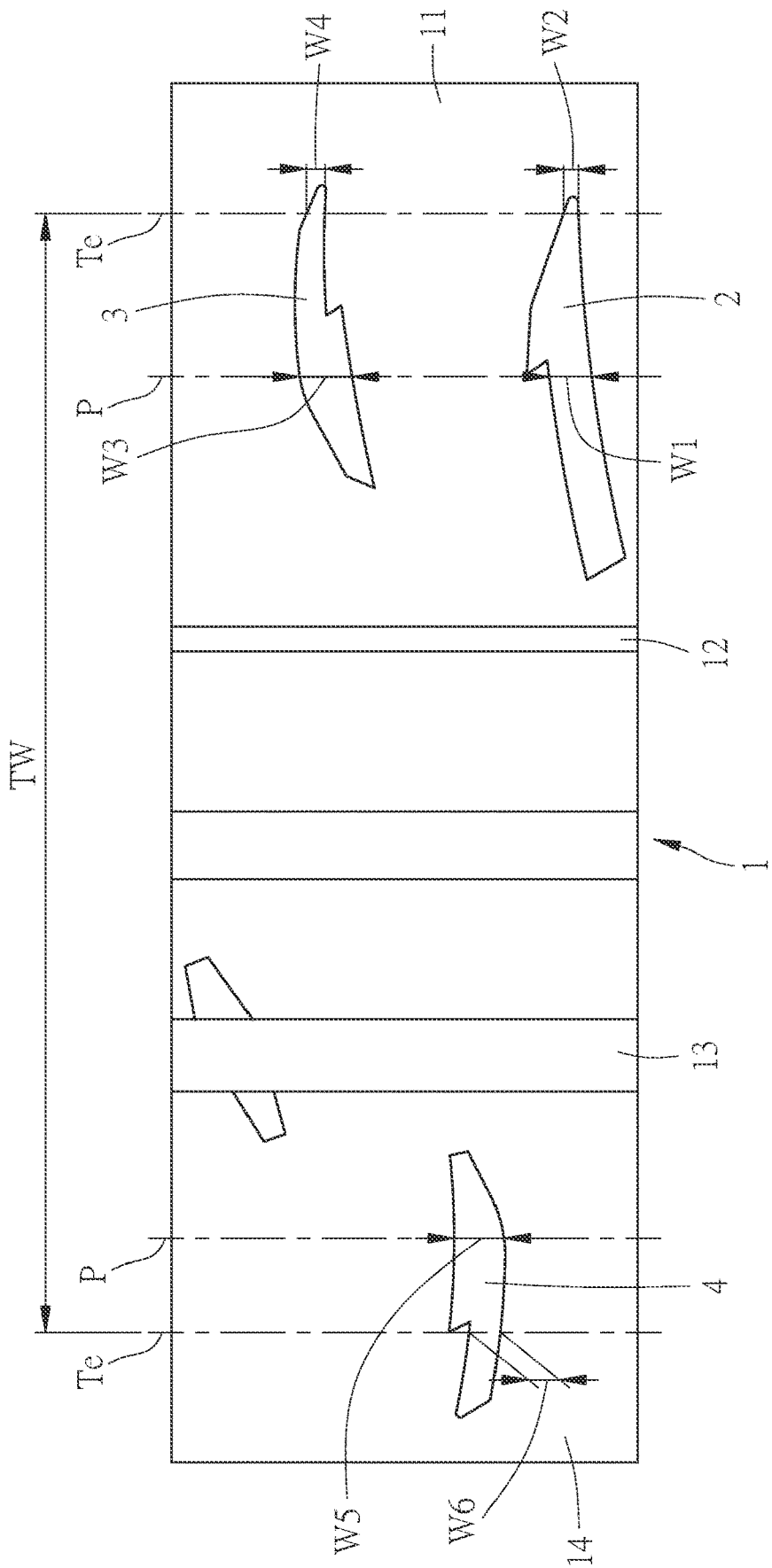
FIG. 3 is a second partial, expanded planar view of the embodiment of the present invention.

Referring to FIG. 2 and FIG. 3, the ground contact pressure line P and the ground contact end line Te on the outer shoulder portion 11 pass through the first auxiliary grooves 2 and the second auxiliary grooves 3. A first ground contact pressure groove width W1 is defined along the ground contact pressure line P on each first auxiliary groove 2. A first ground contact end groove width W2 is defined along the ground contact end line Te on each first auxiliary groove 2. A second ground contact pressure groove width W3 is defined along the ground contact pressure line P on each second auxiliary groove 3. A second ground contact end groove width W4 is defined along the ground contact end line Te on each second auxiliary groove 3.

The ground contact pressure line P and the ground contact end line Te on the inner shoulder portion 14 pass through the third auxiliary grooves 4. A third ground contact pressure groove width W5 is defined along the ground contact pressure line P on each third auxiliary groove 4. A third ground contact end groove width W6 is defined along the ground contact end line Te on each third auxiliary groove 4.

The first ground contact pressure groove width W1 is between 7.5 and 11.3 mm. The second ground contact pressure groove width W3 is between 9.3 and 12.5 mm. The third ground contact pressure groove width W5 is between 9.8 and 17.2 mm. By selecting the values of the first ground contact pressure groove width W1, the second ground contact pressure groove width W3 and the third ground contact pressure groove width W5, the pneumatic tire can maintain steering ability and improve drainage performance.

The first ground contact end groove width W2 is between 3 and 4.5 mm. The second ground contact end groove width W4 is between 3.7 and 5 mm. The third ground contact end groove width W6 is between 6.4 and 10.2 mm.

Preferably, the first ground contact end width W2 is between 30% and 40% of the first ground contact pressure groove width W1. The second ground contact end width W4 is between 30% and 40% of the second ground contact pressure groove width W3. The third ground contact end width W6 is between 58% and 68% of the third ground contact pressure groove width W5. The first ground contact pressure groove width W1 is less than the second ground contact pressure groove width W3. The second ground contact pressure groove width W3 is less than the third ground contact pressure groove width W5.

The first ground contact pressure groove width W1, the second ground contact pressure groove width W3 and the third ground contact pressure groove width W5 on the ground contact pressure line P are wider, which increases the groove capacity to enhance the drainage efficiency, so that the vehicle can retain excellent grip even on slippery roads.

The first ground contact end groove width W2, the second ground contact end groove width W4 and the third ground contact end groove width W6 on the ground contact end line Te are narrower, which improves the rigidity of the outer shoulder portion 11 and the inner shoulder portion 14. Further, the ratio of the first ground contact end groove width W2, the second ground contact end groove width W4 and the third ground contact end groove width W6 can be adjusted. With different ratios, the outer shoulder portion 11 and the inner shoulder portion 14 may obtain different rigidities, thereby achieving excellent steering stability.

The first ground contract pressure groove width W1 is between 2% and 7% of the ground contact width TW. The second ground contract pressure groove width W3 is between 2% and 7% of the ground contact width TW. The third ground contract pressure groove width W5 is between 2% and 7% of the ground contact width TW.

Figure 4:
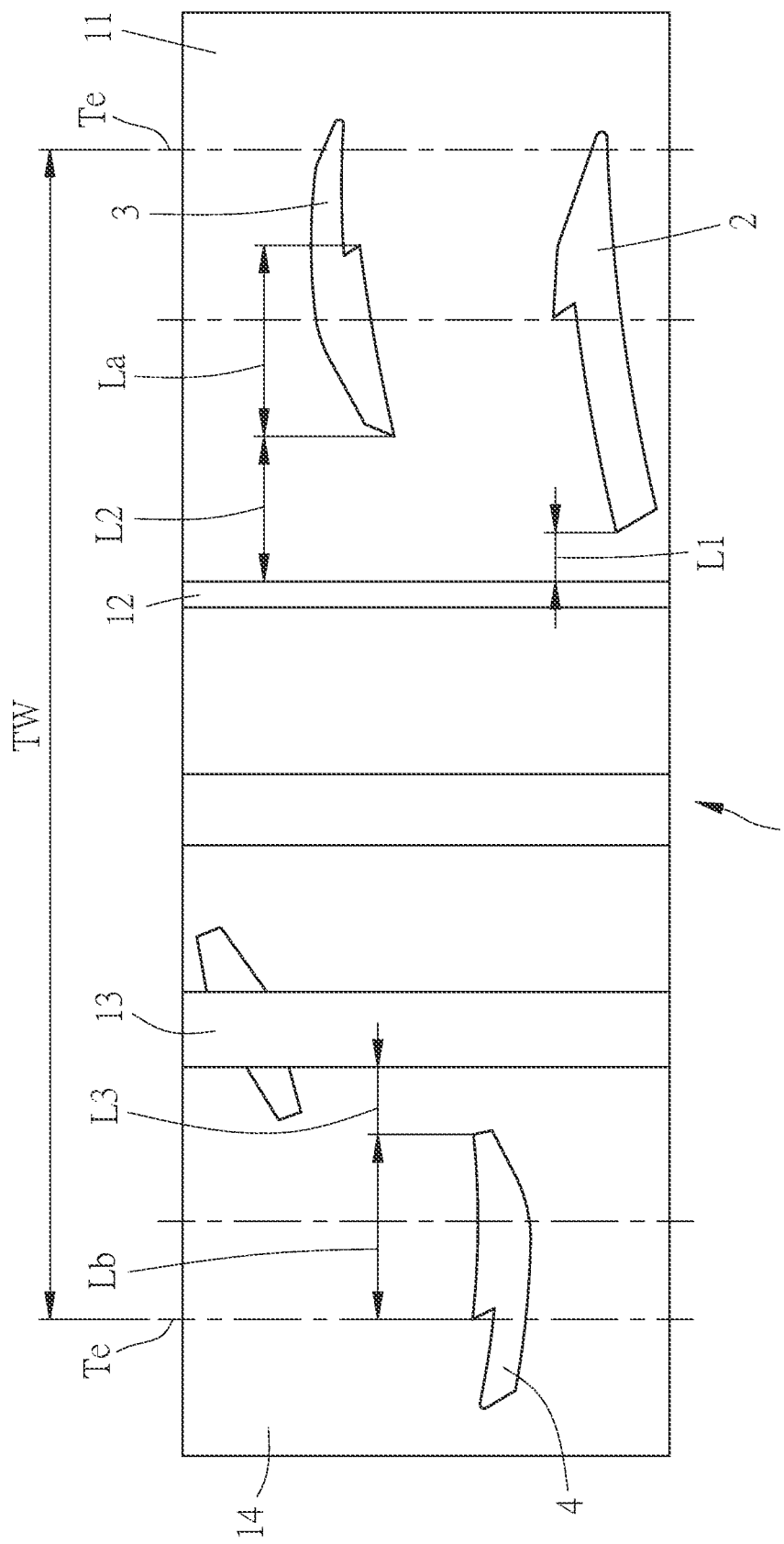
FIG. 4 is a third partial, expanded planar view of the embodiment of the present invention.

Referring to FIG. 2 through FIG. 4, a first distance L1 is defined between the first auxiliary groove 2 and the outer main groove 12. The first distance L1 is between 2% and 6% of the ground contact width TW. A second distance L2 is defined between the second auxiliary groove 3 and the outer main groove 12. The second distance L2 is between 11% and 15% of the ground contact width TW. A third distance L3 is defined between the third auxiliary groove 4 and the inner main groove 13. The third distance L3 is between 4% and 8% of the ground contact width TW.

A second groove length La is defined along the axial direction from the second inner end 31 to the second outer end 32. The second groove length La is between 14% and 18% of the ground contact width TW. A third groove length Lb is defined along the axial direction from the third inner end 41 to the third outer end 42. The third groove length Lb is between 14% and 18% of the ground contact width TW.

The pneumatic tire capable of maintaining steering ability and improving drainage provided by the present invention is tested in a real vehicle as a first embodiment and a second embodiment according to the parameters in the following Table 1, and a conventional tire is tested as a comparative example according to the parameters in the following Table 1.

In the following Table 1, W2/W1 is the ratio of the first ground contact end groove width W2 to the first ground contact pressure groove width W1. W4/W3 is the ratio of the second ground contact end groove width W4 to the second ground contact pressure groove width W3. W6/W5 is the ratio of the third ground contact end groove width W6 to the third ground contact pressure groove width W5. W1/TW is the ratio of the first ground contact pressure groove width W1 to the ground contact width TW. W3/TW is the ratio of the second ground contact pressure groove width W3 to the ground contact width TW. W5/TW is the ratio of the third ground contact pressure groove width W5 to the ground contact width TW.

Dry grip and wet grip are measured in points. The higher points, the better grip. The control stability and drainage performance are the proportions of the values of dry traction and wet traction divided by the values of the corresponding comparative example, respectively.

TABLE 1

Test parameters and results:

| | comparative example | first embodiment | second embodiment |
|---|---|---|---|
| W2/W1 | — | 39% | 39% |
| W4/W3 | — | 40% | 34% |
| W6/W5 | — | 64% | 61% |
| W1/TW | — | 4% | 6% |
| W3/TW | — | 4% | 6% |
| W5/TW | — | 4% | 6% |
| dry grip | 7 | 7.25 | 7 |
| wet grip | 7 | 7 | 7.25 |
| dry traction | 90.9 | 87.8 | 89.0 |
| wet traction | 18.8 | 18.6 | 18.5 |
| steering stability | 100% | 103% | 102% |
| drainage performance | 100% | 101% | 102% |

According to the results of real vehicle tests, the pneumatic tire capable of maintaining steering ability and improving drainage provided by the present invention has good performance in terms of grip and traction in dry handling test. In the wet grip test, the ride passing through the water surface is smooth, without any obvious driving resistance and hydroplaning.

Figure 5:
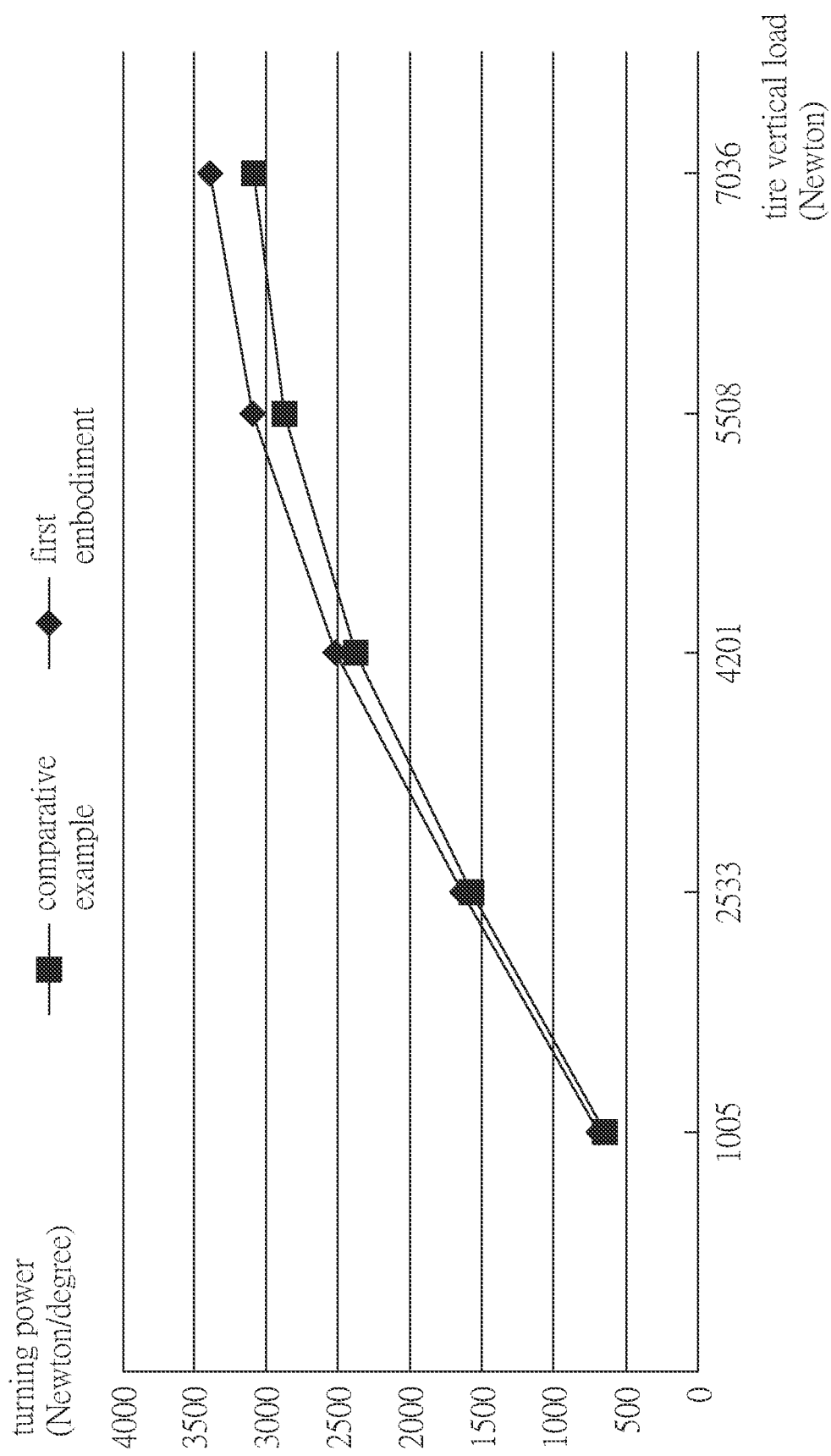
FIG. 5 is a graph showing the relationship between the cornering power and tire vertical load according to a first embodiment of the present invention and a comparative example.

Referring to FIG. 2 and FIG. 5 relating to the turning power test. The following Table 2 and FIG. 5 show the turning power test results of the comparative example and the first embodiment.

TABLE 2

Turning power test results:

| tire vertical load (Newton) | | 1005 | 2533 | 4201 | 5508 | 7036 |
|---|---|---|---|---|---|---|
| cornering power (Newton/degree) | comparative example | 654 | 1580 | 2379 | 2871 | 3082 |
| | first embodiment | 683 | 1647 | 2516 | 3092 | 3392 |

MTS's Flat-Trac steady state system is used. Since turning power is the rate at which the turning force increases as the slip angle increases, the higher the cornering power, the higher the cornering ability and stability of the tire.

From the data of Table 2 above, it can be seen that the pneumatic tire capable of maintaining steering ability and improving drainage provided by the present invention has better cornering power and stability than the comparative example, regardless of the amount of vertical load.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A pneumatic tire, comprising:
a tire body defining an outer side and an inner side opposite to the outer side, the tire body having an outer shoulder portion located on the outer side and an inner shoulder portion located on the inner side, the tire body defining a circumferential direction and an axial direction substantially perpendicular to the circumferential direction;
a plurality of first auxiliary grooves formed on the outer shoulder portion;
a plurality of second auxiliary grooves formed on the outer shoulder portion, wherein each of the plurality of second auxiliary grooves is adjacent to another one of the plurality of first auxiliary grooves; and
a plurality of third auxiliary grooves formed on the inner shoulder portion;
wherein each of the plurality of first auxiliary grooves includes a first inner end adjacent to the inner side, a first notch adjacent to the inner side and extending towards an inside of the corresponding first auxiliary groove, a first outer end on an edge of the corresponding first notch adjacent to the outer side and away from the inside of the corresponding first auxiliary groove, and a first tip on the edge of the corresponding first notch adjacent to the outer side and adjacent to the inside of the corresponding first auxiliary groove, and wherein each of the plurality of first auxiliary grooves is gradually tapered from the first outer end towards the outer side;
wherein each of the plurality of second auxiliary grooves includes a second inner end adjacent to the inner side, a second notch adjacent to the outer side and extending towards an inside of the corresponding second auxiliary groove, a second outer end on an edge of the corresponding second notch adjacent to the inner side and away from the inside of the corresponding second auxiliary groove, and a second tip on the edge of the corresponding second notch adjacent to the inner side and adjacent to the inside of the corresponding second auxiliary groove, and wherein each of the plurality of second auxiliary grooves is gradually tapered from the second outer end towards the inner side;
wherein each of the plurality of third auxiliary grooves includes a third outer end adjacent to the outer side, a third notch adjacent to the inner side and extending towards an inside of the corresponding third auxiliary groove, a third inner end on an edge of the third notch adjacent to the outer side and away from the inside of the corresponding third auxiliary groove, and a third tip on the edge of the corresponding third notch adjacent to the outer side and adjacent to the inside of the corresponding third auxiliary groove, and each of the plurality of third auxiliary grooves is gradually tapered from the third inner end towards the outer side;
wherein in the axial direction, the first tip is located on an outer side of the first outer end, the second tip is located on an inner side of the second outer end, and the third tip is located on an outer side of the third inner end; and wherein a ground contact end line is defined on each of the outer shoulder portion and the inner shoulder portion along the circumferential direction, the ground contact end line on the outer shoulder portion passing through the plurality of first auxiliary grooves and the plurality of second auxiliary grooves, wherein a first ground contact end groove width is defined along the ground contact end line on each of the plurality of first auxiliary grooves, wherein a second ground contact end groove width is defined along the ground contact end line on each of the plurality of second auxiliary grooves, the ground contact end line on the inner shoulder portion passing through the plurality of third auxiliary grooves, wherein a third ground contact end groove width is defined along the ground contact end line on each of the plurality of third auxiliary grooves, wherein the first ground contact end groove width is between 3 and 4.5 mm, the second ground contact end groove width is between 3.7 and 5 mm, and the third ground contact end groove width is between 6.4 and 10.2 mm.

2. The pneumatic tire as claimed in claim 1, wherein a ground contact pressure line is defined on each of the outer shoulder portion and the inner shoulder portion along the circumferential direction, the ground contact pressure line on the outer shoulder portion passes through the first auxiliary grooves and the second auxiliary grooves, a first ground contact pressure groove width is defined along the ground contact pressure line on each first auxiliary groove, a second ground contact pressure groove width is defined along the ground contact pressure line on each second auxiliary groove, the ground contact pressure line on the inner shoulder portion passes through the third auxiliary grooves, a third ground contact pressure groove width is defined along the ground contact pressure line on each third auxiliary groove, the first ground contact pressure groove width is between 7.5 and 11.3 mm, the second ground contact pressure groove width is between 9.3 and 12.5 mm, and the third ground contact pressure groove width is between 9.8 and 17.2 mm.

3. The pneumatic tire as claimed in claim 2, wherein the first ground contact end width is between 30% and 40% of the first ground contact pressure groove width, the second ground contact end width is between 30% and 40% of the second ground contact pressure groove width, and the third ground contact end width is between 58% and 68% of the third ground contact pressure groove width.

4. The pneumatic tire as claimed in claim 2, wherein a ground contact width is defined along the axial direction between the two ground contact end lines on the outer shoulder portion and the inner shoulder portion, the ground contact width is between 185 and 245 mm, the first ground contact pressure groove width is between 2% and 7% of the ground contact width, the second ground contact pressure groove width is between 2% and 7% of the ground contact width, and the third ground contact pressure groove width is between 2% and 7% of the ground contact width.

5. The pneumatic tire as claimed in claim 2, wherein the first ground contact pressure groove width is less than the second ground contact pressure groove width, and wherein the second ground contact pressure groove width is less than the third ground contact pressure groove width.

6. The pneumatic tire as claimed in claim 1, wherein a ground contact width is defined along the axial direction between the two ground contact end lines on the outer shoulder portion and the inner shoulder portion, wherein the tire body further, includes an outer main groove adjacent to the outer shoulder portion and an inner main groove adjacent to the outer main groove and the inner shoulder portion, wherein a first distance is defined between a corresponding one of the plurality of first auxiliary grooves and the outer main groove, the first distance is between 2% and 6% of the ground contact width, wherein a second distance is defined between a corresponding one of the plurality of second auxiliary grooves and the outer main groove, the second distance is between 11% and 15% of the ground contact width, and wherein a third distance is defined between a corresponding one of the plurality of third auxiliary grooves and the inner main groove, and the third distance is between 4% and 8% of the ground contact width.

7. The pneumatic tire as claimed in claim 1, wherein a ground contact width is defined along the axial direction between the ground contact end line on the outer shoulder portion and the ground contact end line on the inner shoulder portion, wherein a second groove length is defined along the axial direction from the second inner end to the second outer end, the second groove length being between 14% and 18% of the ground contact width, wherein a third groove length is defined along the axial direction from the third inner end to the third outer end, and the third groove length being between 14% and 18% of the ground contact width.

8. The pneumatic tire as claimed in claim 1, wherein the plurality of first auxiliary grooves and the plurality of second auxiliary grooves are alternately arranged on the outer shoulder portion along the circumferential direction.

9. A pneumatic tire, comprising:
a tire body defining an outer side and an inner side opposite to the outer side, the tire body having an outer shoulder portion located on the outer side and an inner shoulder portion located on the inner side, the tire body defining a circumferential direction and an axial direction substantially perpendicular to the circumferential direction;
a plurality of first auxiliary grooves formed on the outer shoulder portion;
a plurality of second auxiliary grooves formed on the outer shoulder portion, wherein each of the plurality of second auxiliary grooves is adjacent to another one of the plurality of first auxiliary grooves; and
a plurality of third auxiliary grooves formed on the inner shoulder portion;
wherein each of the plurality of first auxiliary grooves includes a first inner end adjacent to the inner side, a first notch adjacent to the inner side and extending towards an inside of the corresponding first auxiliary groove, a first outer end on an edge of the corresponding first notch adjacent to the outer side and away from the inside of the corresponding first auxiliary groove, and a first tip on the edge of the corresponding first notch adjacent to the outer side and adjacent to the inside of the corresponding first auxiliary groove, and wherein each of the plurality of first auxiliary grooves is gradually tapered from the first outer end towards the outer side;
wherein each of the plurality of second auxiliary grooves includes a second inner end adjacent to the inner side, a second notch adjacent to the outer side and extending towards an inside of the corresponding second auxiliary groove, a second outer end on an edge of the corresponding second notch adjacent to the inner side and away from the inside of the corresponding second auxiliary groove, and a second tip on the edge of the corresponding second notch adjacent to the inner side and adjacent to the inside of the corresponding second auxiliary groove, and wherein each of the plurality of second auxiliary grooves is gradually tapered from the second outer end towards the inner side;

wherein each of the plurality of third auxiliary grooves includes a third outer end adjacent to the outer side, a third notch adjacent to the inner side and extending towards an inside of the corresponding third auxiliary groove, a third inner end on an edge of the third notch adjacent to the outer side and away from the inside of the corresponding third auxiliary groove, and a third tip on the edge of the corresponding third notch adjacent to the outer side and adjacent to the inside of the corresponding third auxiliary groove, and each of the plurality of third auxiliary grooves is gradually tapered from the third inner end towards the outer side;

wherein in the axial direction, the first tip is located on an outer side of the first outer end, the second tip is located on an inner side of the second outer end, and the third tip is located on an outer side of the third inner end; and wherein a ground contact pressure line is defined on each of the outer shoulder portion and the inner shoulder portion along the circumferential direction, the ground contact pressure line on the outer shoulder portion passes through the plurality of first auxiliary grooves and the plurality of second auxiliary grooves, wherein a first ground contact pressure groove width is defined along the ground contact pressure line on each of the plurality of first auxiliary grooves, a second ground contact pressure groove width is defined along the ground contact pressure line on each of the plurality of second auxiliary grooves, wherein the ground contact pressure line on the inner shoulder portion passes through the plurality of third auxiliary grooves, a third ground contact pressure groove width is defined along the ground contact pressure line on each of the plurality of third auxiliary grooves, wherein the first ground contact pressure groove width is between 7.5 and 11.3 mm, the second ground contact pressure groove width is between 9.3 and 12.5 mm, and the third ground contact pressure groove width is between 9.8 and 17.2 mm, and wherein the first ground contact pressure groove width is less than the second ground contact pressure groove width, and the second ground contact pressure groove width is less than the third ground contact pressure groove width.

* * * * *